US011307581B2

(12) United States Patent
Tiana (10) Patent No.: US 11,307,581 B2
(45) Date of Patent: Apr. 19, 2022

(54) MULTISPECTRALLY ENHANCED SYNTHETIC VISION DATABASE SYSTEM AND METHOD

(71) Applicant: Rockwell Collins, Inc., Cedar Rapids, IA (US)

(72) Inventor: Carlo L. Tiana, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 461 days.

(21) Appl. No.: 16/288,407

(22) Filed: Feb. 28, 2019

(65) Prior Publication Data

US 2020/0278676 A1    Sep. 3, 2020

(51) Int. Cl.
| | | |
|---|---|---|
| *G05D 1/00* | (2006.01) | |
| *G01S 17/89* | (2020.01) | |
| *G01C 21/00* | (2006.01) | |
| *G01S 17/02* | (2020.01) | |
| *G06T 7/00* | (2017.01) | |
| *G08G 5/00* | (2006.01) | |
| *G01S 17/06* | (2006.01) | |
| *G05D 1/02* | (2020.01) | |
| *G06V 20/10* | (2022.01) | |

(52) U.S. Cl.
CPC ............ *G05D 1/0088* (2013.01); *G01S 17/06* (2013.01); *G01S 17/89* (2013.01); *G05D 1/0202* (2013.01); *G06V 20/176* (2022.01); *G06T 2207/10036* (2013.01)

(58) Field of Classification Search
None
See application file for complete search history.

(56) References Cited

U.S. PATENT DOCUMENTS 10,001,376 B1    6/2018  Tiana et al.
2010/0231418 A1*  9/2010  Whitlow .............. G01S 7/411
                                          340/945

(Continued)

FOREIGN PATENT DOCUMENTS

WO        2016094849 A1      6/2016
WO    WO-2019147173 A1 *    8/2019  .......... G08G 5/0086

OTHER PUBLICATIONS

Extended Search Report dated Jun. 5, 2020 for EP Application No. 19208136.

*Primary Examiner* — Adam D Tissot
*Assistant Examiner* — Laura E Linhardt
(74) *Attorney, Agent, or Firm* — Suiter Swantz pc llo (57) ABSTRACT

A system and method for augmenting synthetic vision system (SVS) databases with spectrum diverse features that are matched to the observations of natural scenes derived from non-visible band sensors. The system correlates sensor output with a-priori information in databases to enhance system precision and robustness. Multiple diverse sensors image naturally occurring, or artificial features (towers buildings etc.) and store the multi-spectral attributes of those features within the enhanced multi-spectral database and share the information with other systems. The system, upon "live" observation of those features and attributes, correlates current observations with expected fiducial observations in the multi-spectral database and confirms operation, navigation, precise position, and sensor fidelity to enable autonomous operation of an aircraft employing the system.

20 Claims, 8 Drawing Sheets

(56) References Cited

U.S. PATENT DOCUMENTS

| | | | |
|---|---|---|---|
| 2013/0325215 A1 | 12/2013 | Vos et al. | |
| 2016/0266579 A1* | 9/2016 | Chen | H04L 67/125 |
| 2016/0335901 A1* | 11/2016 | Singh | G08G 5/0021 |
| 2020/0293045 A1* | 9/2020 | Ghiglino Novoa | B64C 39/024 |

* cited by examiner

MULTISPECTRALLY ENHANCED SYNTHETIC VISION DATABASE SYSTEM AND METHOD

CROSS-REFERENCE TO RELATED APPLICATIONS

The present application is related to the following co pending U.S. Patent Applications:

U.S. patent application Ser. No. 16/288,531 filed Feb. 28, 2019 entitled "Design and Processing of Multispectral Sensors for Autonomous Flight", U.S. patent application Ser. No. 16/288,770 filed Feb. 28, 2019 entitled "Autonomous Aircraft Sensor-Based Positioning and Navigation System Using Markers", and U.S. patent application Ser. No. 16/289,786 filed Mar. 1, 2019 entitled "Guidance Deviation Derivation from High Assurance Hybrid Position Solution System and Method", the contents of which above-named U.S. Patent Applications are herein incorporated by reference in their entirety.

BACKGROUND

Most large commercial airfields maintain a precision landing system able to transmit precise positioning data to an aircrew and to a Flight Management System (FMS). This precise positioning data may enable an aircraft to accurately navigate to safe landing in all-weather conditions. Also, most commercial aircraft maintain hardware and avionics to enable the aircraft to receive and process signals from such precision landing systems. For example, an Instrument Landing System (ILS) may provide very precise glide slope and localizer information receivable by an aircraft. The aircraft may be capable of displaying this information (raw data) to a pilot as well as supplying the data to the FMS. Some advanced aircraft may maintain a capability to couple an autopilot to the FMS commanding the autopilot to correct for deviations in each received parameter (e.g., glideslope and localizer) to safely navigate the aircraft to the runway.

Coupled with traditional autopilot capabilities, the advanced aircraft may accurately fly in a coupled mode through the descent, approach, landing, and rollout all based on received RF signals from the ground-based ILS transmitter and measured internal aircraft parameters (speed, pitch, and power).

Synthetic vision systems (SVS) may also aid the advanced manned aircraft offering the human pilot an ability to visualize objects generated from a database and displayed to the pilot or sensed in real time by a camera supported SVS. However, in weather conditions, such camera supported SVS may be unable to sense (visualize) any object reducing the capabilities of the SVS.

Furthermore, an advanced autonomous (unmanned) aircraft may not require the same visual displays as are required for a manned aircraft to safely navigate. Manned aircraft may require a display visible to a human. Such human oriented displays may require additional hardware (weight) and processing to produce the human oriented display. The advanced autonomous aircraft may rely on, and safely navigate with, alternate data produced by a sensor operating in an electromagnetic band that may or may not include a visible spectrum.

Therefore, a need remains for a system and related method for offering multispectral (MS) attributes of sensed objects stored within a multispectral database accessible by the advanced autonomous aircraft FMS. The multispectral attributes may be sensed by a plurality of spectrum diverse visual and non-visual sensors offering an augmented SVS MS database from which precise positioning information may be derived and usable for autonomous positioning and navigation. This precise positioning data based on data received from a combined suite of spectrum diverse sensors may enable the advanced autonomous aircraft to operate at any airport despite the weather conditions.

SUMMARY

In one aspect, embodiments of the inventive concepts disclosed herein are directed to a system for multispectral object identification using a plurality of multispectral attributes of objects stored within a multispectrally enhanced synthetic vision database. The system may comprise an autonomous aircraft sensor suite onboard an autonomous aircraft including at least one of: a vision system (VS), a radio frequency (RF) radio detection and ranging (RADAR) system, a laser imaging detection and ranging (LIDAR) system, a map database, and an avionics suite. In embodiments, an object identification (ID) and positioning system may be associated with the autonomous aircraft sensor suite and may include a processor configured to assist the object ID and positioning system. Associated with the object ID and positioning system, a storage including a multispectral (MS) database including a plurality of historical object data defining a plurality of objects may be available for use by the object ID and positioning system. Also associated with the object ID and positioning system, a tangible, non-transitory memory within the storage configured to communicate with the processor, the tangible, non-transitory memory having instructions stored therein that, in response to execution by the at least one processor, cause the at least one processor to carry out one or more functions of the system for multispectral object identification.

In one embodiment of the inventive concepts disclosed herein, the object identification and positioning system may be configured to receive first sensor data from a first sensor of the autonomous aircraft sensor suite, the first sensor operating within a first spectrum, the first sensor data including a first attribute of a sensed object. Also, the object ID and positioning system may compare the received first attribute to the historical object data and identify the sensed object if the first attribute comparison results in a match. If the comparison does not result in a match, the object ID and positioning system may update the MS database or a partition thereof with the first attribute of the sensed object.

Also, the system may receive second sensor data from a second sensor of the autonomous aircraft sensor suite, the second sensor data including a second attribute of the sensed object, the second sensor operating within a second spectrum diverse from the first spectrum. The system may compare the received second attribute to the historical object data and, as above, identify the sensed object if the second attribute comparison results in a match and update as well as flag for later updating the MS database with the second attribute of the sensed object if the second attribute comparison does not result in a match.

Once the object ID and positioning system may match sensed with historical attributes, the system may determine a position of the autonomous aircraft based on the identification of the sensed object.

An additional embodiment of the inventive concepts disclosed herein may be directed to a method for multispectral object identification. The method may comprise receiving first sensor data from a first sensor of an autonomous aircraft sensor suite onboard an autonomous aircraft, the first sensor operating within a first spectrum, the first sensor data including a first attribute of a sensed object. The method may compare the first attribute to a plurality of historical object data within a multispectral (MS) database associated with a storage onboard the autonomous aircraft. Should the comparison result in a match, the method may identify the sensed object and if not, the method may update as well as flag for later updating the MS database with the first attribute.

The method may receive second sensor data from a second sensor of the autonomous aircraft sensor suite, the second sensor data including a second attribute of the sensed object, the second sensor operating within a second spectrum diverse from the first spectrum. The method may compare the second attribute to the historical object data and identify the sensed object if the second attribute comparison results in a match and determine a position of the autonomous aircraft based on the identification of the sensed object. If the comparison results in no match, the method may update the MS database or a partition thereof with the second attribute of the sensed object.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and method for augmenting synthetic vision system (SVS) databases with spectrum diverse features that are matched to the observations of natural scenes derived from non-visible band sensors. The system correlates sensor output with a-priori information in databases to enhance system precision and robustness. Multiple diverse sensors image naturally occurring, or artificial features (towers buildings etc.) and store the multi-spectral attributes of those features within the enhanced multi-spectral database and share the information with other systems. The system, upon "live" observation of those features and attributes, correlates current observations with expected fiducial observations in the multi-spectral database and confirms operation, navigation, precise position, and sensor fidelity to enable autonomous operation of an aircraft employing the system.

| Reference Chart | |
|---|---|
| 100 | Multispectral System |
| 120 | Autonomous Aircraft |
| 122 | Flight Controls |
| 130 | Sensor Suite |
| 132 | Vision System (VS) |
| 134 | RF RADAR System |
| 136 | LIDAR System |
| 138 | Maps System |
| 140 | Avionics Sensors |
| 142 | Avionics Sensor Data |
| 150 | Object ID and Positioning System |
| 152 | Processor |
| 154 | Storage Multispectral Database |
| 160 | Flight Management System |
| 200 | Diagram of Data Details |
| 232 | Video Stream |
| 234 | RADAR Relative Map |
| 236 | LIDAR Relative Map |
| 238 | Map Data |
| 240 | Position |
| 242 | Trajectory |
| 244 | Aircraft Configuration |
| 246 | Aircraft Status |
| 300 | MS Enhanced Database Logic |
| 302 | Receive sensor data |
| 304 | Flight Analysis |
| 306 | Determine Sensor Hierarchy |
| 308 | First Sensor Attribute Match |
| 310 | Identify Object |
| 312 | Determine Position |
| 314 | Update MS Database Partition |
| 316 | Share MS Database |
| 318 | Second Sensor Attribute Match |
| 320 | n Sensor Attribute Match |
| 322 | Manipulate Flight Controls |
| 332 | Video Stream Elements |
| 334 | RADAR Relative Map Elements |
| 336 | LIDAR Relative Map Elements |
| 338 | Map Data Elements |
| 340 | Position Elements |
| 342 | Trajectory Elements |
| 344 | Aircraft Configuration Elements |
| 346 | Aircraft Status Elements |
| 400 | MS Enhanced Database Flow |
| 402 | Receive Object Attribute |
| 404 | Compare Attribute to MS Database |
| 406 | ID Object |
| 408 | Update MS Database with New Attribute |
| 410 | Compare Object MS Attribute Between Diverse Sensors |
| 412 | Update MS Database with Object MS Attribute |
| 414 | Determine Aircraft Position |
| 416 | Manipulate Flight Controls |
| 500 | Arrival View |
| 530 | Sensor FOV |
| 540 | Radar LOS |
| 542 | Runway |
| 544 | Road Intersection |
| 546 | Racetrack |
| 548 | Golf Course |
| 550 | Interchange |
| 600 | Approach View |
| 652 | LAS 19L |
| 654 | Blast Fence East End |
| 656 | Street Intersection |
| 658 | LAS 19R |
| 660 | Runway Centerline |
| 662 | TDZ Markings |
| 664 | Hotel Taxiway |
| 666 | Blast Fence West End |
| 668 | Hangar South End |
| 670 | Building SE Corner |
| 672 | Building NE Corner |
| 674 | Building HVAC |

Figure 1:
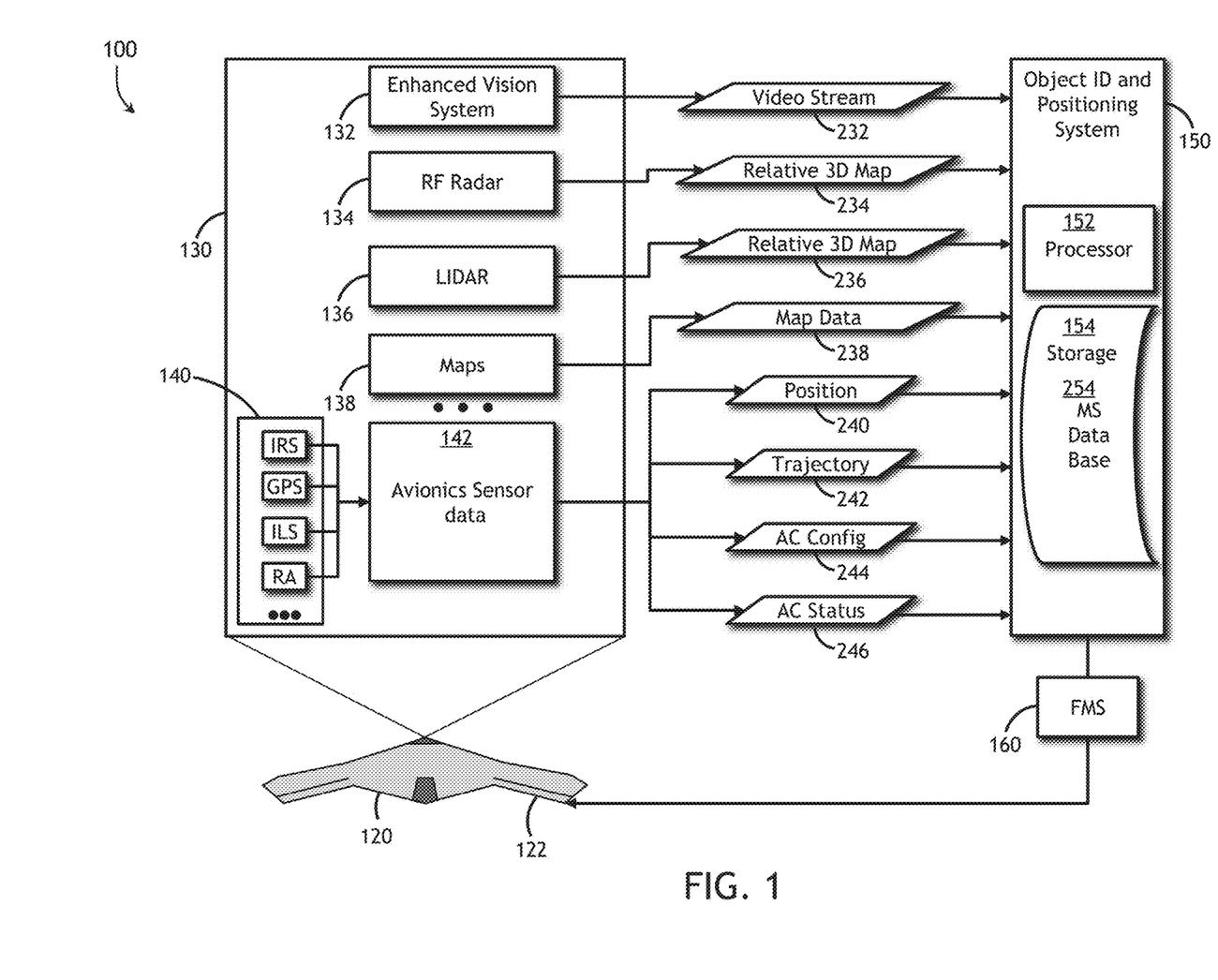
FIG. 1 is a diagram of a multispectral object identification system in accordance with an embodiment of the inventive concepts disclosed herein.

FIG. 1 Hardware

Referring now to FIG. 1, a diagram of a multispectral object identification system in accordance with an embodiment of the inventive concepts disclosed herein is shown. A MS system 100 may enable the autonomous aircraft 120 to receive sensor data from a plurality of sensors within a sensor suite 130. Within the sensor suite 130, a Vision System (VS) 132, a Radio Frequency (RF) RADAR system 134, a LIDAR system 136, a maps system 138 and an avionics suite 140 may provide sensor data to an object ID and positioning system 150. Avionics data 142 may include data generated by an Inertial Reference System (IRS), a Global Positioning System (GPS), an Instrument Landing System (ILS), and a Radio Altimeter system (RA). Contemplated herein, additional avionics sensors may be beneficial to the object ID and positioning system 150 for used in accordance with embodiment described herein.

In one embodiment of the inventive concepts disclosed herein, the sensor suite 130 may include a plurality of sensors configured for providing information to the object ID and positioning system 150. An operator may select one or more sensors to accomplish a specific mission yet minimize size, weight, power and cost. Each sensor suite may span a large swath of the electromagnetic spectrum allowing atmospheric penetration in the relevant ranges of approximately 1 to 10 km. Sensors which may operate in the Visual Spectrum, from approximately 450 to 700 nm, in the Near-Infrared (NIR) spectrum of approximately 750 to 950 nm, in the Short-Wave Infrared (SWIR) spectrum operating approximately in the 1-2 μm spectral band and thermal infrared sensors operating in the 3 to 5 μm and 7 to 15 μm bands may fall within the scope of the inventive concepts disclosed herein.

These sensors may support frame rates of a minimum required of about 10 Hz and up to 400 Hz, or more. Other sensors may operate in the Radio-Frequency bands, from X to W band, from 10 GHz to 220 GHz and operate in pulsed or Frequency Modulated Continuous Wave (FMCW) RADAR mode, with frame update rates of a minimum of 10 Hz and up to 30 Hz or higher, potentially scanning a "region of interest" within the total field of view. Each of these sensors may provide "Enhanced Vision System" capabilities to a modern cockpit. Another type of "synthetic" image may be computer generated from an onboard a-priori database and is typically referred to as a "Synthetic Vision System (SVS)". Each of these sources of positioning information may be combined into a "Combined Vision System (CVS)" which may present to a human pilot flying (onboard and remote), and to an autonomous aircraft pilotage system, an overall reliable and assured view of the operating environment in all visibility conditions.

In embodiments, sensor data may include an object attribute such as an object identification (name, reference, etc.), a position of the object with reference to a datum, an altitude of the object (mean sea level and above ground level), and a bearing, range, and altitude (BRA) of the object relative to the autonomous aircraft 120. The datum may be defined as a vertical geodetic reference datum (altitude) and a horizontal geodetic reference datum (latitude, longitude, grid).

The object identification and positioning system 150 may be configured to receive sensor data from one or more sensors of the sensor suite 130 where the sensor data may include the plurality of attributes associated with a sensed object. Here, a sensed object may be defined as any object within a field of view (FOV) of one of the sensors and able to be imaged and therefore measured by the sensor. Also, a sensed object may include a terrain object, a geographical object, a natural object, a man-made object, an airport prepared surface, and a landing surface. An attribute of the sensed object may include characteristics of the sensed object which may highlight the object to the specific sensor.

For example, a desired object may include any object to which or from which an operator of the autonomous aircraft 120 may desire navigation or positioning. Here, an object may include a sensor significant object able to be sensed by any of the sensors within the sensor suite 130. For example, a desirable object may include a building, a road intersection, a RADAR significant object, a flight deck, an aircraft, and a target of interest.

In one embodiment of the inventive concepts disclosed herein, the object identification and positioning system 150 may include a processor 152 and a storage 154. The storage 154 may comprise a MS database 254 which may be functional to store a plurality of attributes associated with each object as well as instructions for controlling the object ID and positioning system 150. Each sensed object may inherently possess a plurality of attributes which may describe the object.

For example, an attribute of a sensed object may include an object three-dimensional position relative to the datum (e.g., latitude, longitude, MSL altitude), a visibly distinct difference from surrounding terrain (e.g., color texture, size, terrain flow), a RADAR cross section (RCS), a specific map feature, a shape, a size, a reflectivity level, a radar cross section, and a frequency of RF radiation. Each sensor within the sensor suite 130 may sense a specific attribute of an object and operate solely (positioning) or in concert (hybrid positioning) to assist the object identification and positioning system 150 in determining a precise position of the autonomous aircraft 120.

The VS 132 may include a plurality of components and capabilities. One component of the VS 132 may include a Synthetic Vision System (SVS) configured to receive data from a database and provide database generated attributes to the object ID and positioning system 150 for use in positioning. Another component of the VS 132 may include an Enhanced Vision System (EVS) including a camera sensor of a plurality of wavelengths and providing those camera sensed attributes to the object ID and positioning system 150. Additionally contemplated herein, a Combined Vision System (CVS) may incorporate within the VS 132 to provide a synthesis of both database attributes with camera sensed attributes offered to the object ID and positioning system 150 for analysis and autonomous aircraft 120 position determination.

For example, the VS 132 may be capable of imaging a specific pattern of terrain such as a mountain range, a runway pattern, a river, or a river valley. In one embodiment, the VS 132 may function with reference to the MS database 254 offering object attributes to the object ID and positioning system 150 for precise positioning. In additional embodiments, the VS 132 may employ a camera to visibly image surrounding objects and offer the sensed data via a video stream data 232 to the object ID and positioning system 150.

One attribute of the terrain or runway object may be its distinct difference from surrounding terrain. Coupled with a terrain database within the MS database 254, the VS 132 by itself may offer precise positioning ability to the autonomous aircraft 120 based on a single bearing and range from the known position of the known (historical attributes) object or a triangulation of bearings from one or more visibly sensed objects.

In one embodiment of the inventive concepts disclosed herein, the MS database 254 may be partitioned into two or more partitions for effective and compliant storage of each attribute. In one embodiment, a first partition of the MS database may include a readable only set of data from which the object ID and positioning system 150 may retrace data for comparison. Under regulatory oversight, this first partition may remain unchanged during a flight of the autonomous aircraft 120. A second partition may include those data including newly sensed attributes of historical objects. In this manner, the attributes may be flagged for analysis after a mission may complete. A third partition may include additional instructions and details relative to updating and configuring either of the first and/or second partition for offboard sharing.

For example, the first partition of the MS database 254 may include a set of data approved for flight by a regulatory authority. This approved set of data may be required to remain unchanged during the flight to ensure the object ID and positioning system 150 has a valid set of data from which to compare newly sensed sensor data.

The RF RADAR system 134 may also operate solely as a positioning system, capable of generating a relative 3D map data 234 and provide the data to the object ID and positioning system 150 for BRA determination from a single known object or a BRA triangulation from one or more sensed objects. Also, the RF RADAR system 134 may function to complement each of the other sensors within the sensor suite 130. A RADAR significant object having a RADAR cross section (RCS) measurable by the RF RADAR system 134 sensor may be one example of an object sensed by the RF RADAR system 134. Depending on RF RADAR system 134 sensitivity, an object with a high RCS or low RCS may be a desirable object to use by the object ID and positioning system 150 for precise positioning.

For example, an electrical grid hub of converging towers and wires may be exceptionally visible to the RF RADAR system 134. Compared with historical positioning data within the MS database 254, the object identification and positioning system 150 may determine the precise position based on BRA information as well as an aircraft trajectory and speed from position data over time. Sensed RADAR data compared with RCS attributes of historical objects within the MS database 254 may offer precise triangulation positioning capabilities based solely on returns from the RF RADAR system 134. Combined with the relative 3D map data 234, the object identification and positioning system 150 may determine the precise position based on sensed data from one or more of the additional sensors within the sensor suite 130.

The sensor suite may also employ the LIDAR system 136 to sense objects nearby the autonomous aircraft 120. Transmitted laser energy from the LIDAR system 136 may be reflected and received to produce the LIDAR relative 3D map data 236. The LIDAR 3D map data 236 may provide a detailed snapshot of sensed objects within the FOV of the LIDAR system 136. As a sole positioning source, or in combination with the additional sensors, the LIDAR system 136 may supply the LIDAR relative 3D map data 236 to the object identification and positioning system 150 allowing the object identification and positioning system 150 to determine positioning information based on the sensed object BRA from the autonomous aircraft 120.

Map system 138 may function to provide the object identification and positioning system 150 with detailed ground map data 238 from an area relevant to autonomous aircraft 120. Combined with inputs from onboard positioning systems, the object identification and positioning system 150 may receive the map data from the MS database 254 and correlate the map data with received sensor data to determine the precise position.

For example, the map data may include an airport diagram including runways, taxiways, and buildings (e.g., hangars). The object identification and positioning system 150 may correlate the precise position with the map data 238 to navigate the autonomous aircraft 120 to a position for possible landing on one of the runways. Further, during a taxi phase, the object identification and positioning system 150 may determine the precise position of the autonomous aircraft 120 based on received sensor data correlated with the airport diagram of the taxiways.

In one embodiment of the inventive concepts disclosed herein, the avionics suite 140 may operate to provide the object identification and positioning system 150 with traditional avionics sensor data 142 allowing the object identification and positioning system 150 to correlate the avionics sensor data with additional sensor data to determine the precise position. An inertial reference system (IRS) may function as a traditional inertial system to offer accurate positioning information to the object identification and positioning system 150.

A global positioning system (GPS) may offer similar, likely more accurate, positioning information to the object identification and positioning system 150. Here, the term GPS may refer to all satellite-based positioning and timing systems. The generic term GPS is used here for descriptive purposes only and may not limit the use of additional satellite-based systems for the object identification and positioning system 150 to determine the precise position.

Each of the IRS and the GPS may offer position data 240 for the object ID and positioning system 150 to use as one source of positioning information. In addition, IRS and GPS data over time may offer trajectory data 242 to the object ID and positioning system 150. Autonomous aircraft 120 configuration data 244 as well as autonomous aircraft 120 status data 246 may aid the object ID and positioning system 150 in determining the precise position.

In embodiments, an ILS system may provide the object identification and positioning system 150 with accurate localizer and glideslope information relative to a desired runway. By itself, the ILS system has traditionally and accurately guided aircraft to runways. However, working in cooperation with the object identification and positioning system 150, the ILS may offer accurate positioning information relative to a runway and increase the accuracy of the precise position.

In one embodiment of the inventive concepts disclosed herein, a Radio Altimeter (RA) system may operate similar to a traditional manner offering precise altimetry within a threshold AGL altitude. For example, if the autonomous aircraft 120 is operating at or below an exemplary 2,000 ft AGL, the RA may offer range data from the autonomous aircraft 120 to the surface below. Especially during landing operations, the RA system may become a valuable source of AGL altitude information available to the object identification and positioning system 150 and the FMS 210.

However, each of the avionics suite 140 systems may possess inherent limitations. A GPS signal may be jammed or unavailable. A glideslope portion or the entirety of an ILS system may be inoperative requiring alternate procedures. Each of these limitations may require reliance on other positioning systems and sensors for the object identification and positioning system 150 to determine the precise position. Nevertheless, when operable, each of the avionics sensors 140 may offer valuable avionics sensor data 142 to the object identification and positioning system 150 to complement the precise position.

In one embodiment of the inventive concepts disclosed herein, the object identification and positioning system 150 may store the received sensor data in the MS database 254 within the storage. The MS database 254 may receive this new information and add the new information to historical object data. The historical object data may include specific attributes defining the object. For example, position, altitude, and size may be specific attributes defining an object. The object identification and positioning system 150 may compare the received sensor data to the historical object data and identify the sensed object based on the comparison. Should the object identification and positioning system 150 make a match between the sensed data and the historical data, the object identification and positioning system 150 may positively identify the object and, therefore, determine the precise position. Once positioning information is known, the object ID and positioning system 150 may command an autonomous aircraft 120 flight management system 160 to control one or more flight controls 122 onboard the autonomous aircraft 120.

Of note, each individual sensor within the sensor suite 130 may offer more accurate sensor data at differing ranges and altitudes. For example, at an altitude of 45,000 ft MSL (FL450), the GPS may be the most accurate of the sensors while at 110 ft AGL, the VS 132 may offer the most accurate set of data to the object ID and positioning system 150. Acting in concert, the sensor suite 130 may offer the precise positioning solution at all altitudes.

Figure 2:
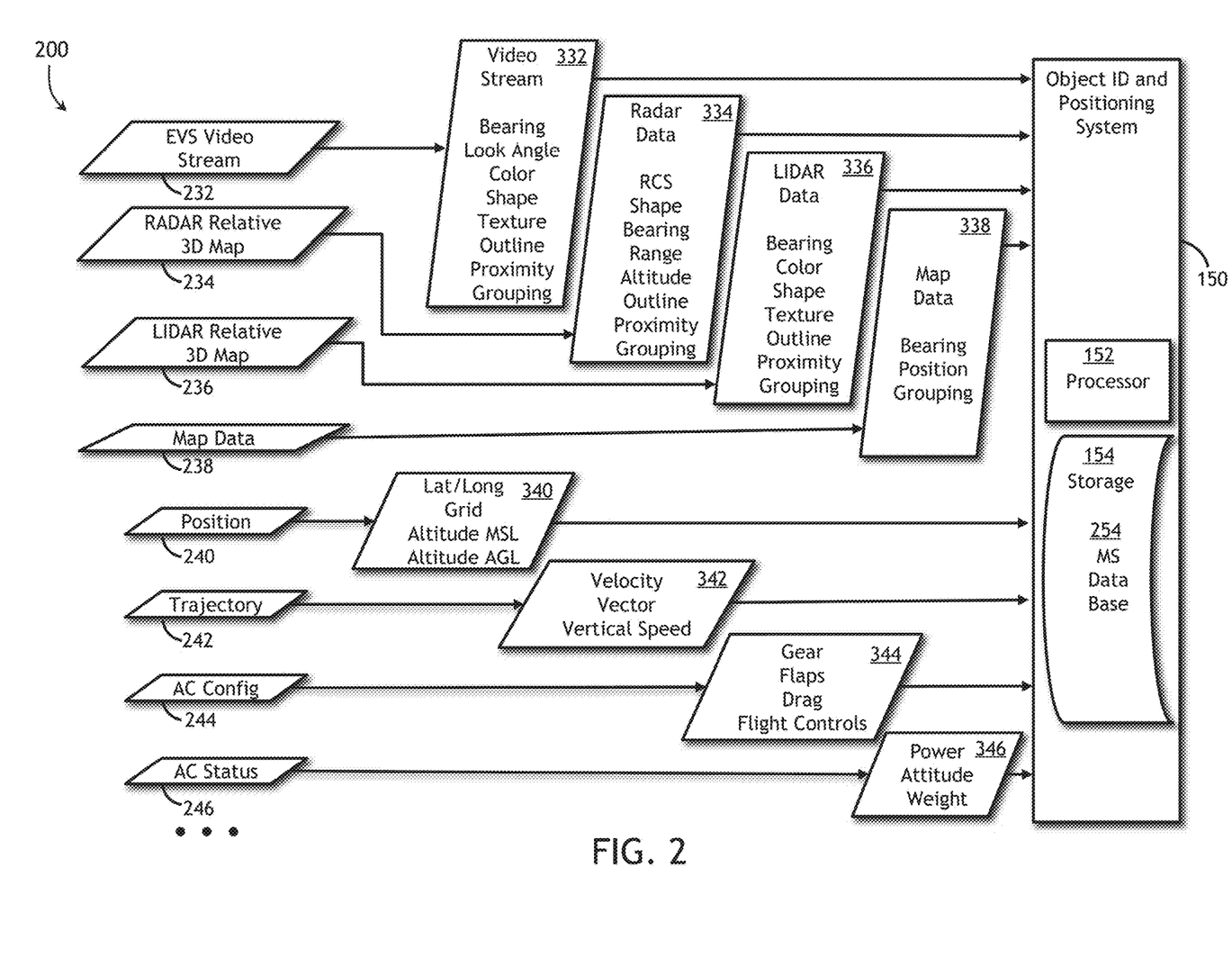
FIG. 2 is a diagram of data details usable by an embodiment of the inventive concepts disclosed herein.

FIG. 2 Data

Referring now to FIG. 2, a diagram of data details usable by an embodiment of the inventive concepts disclosed herein is shown. A diagram of data details 200 may indicate data streams usable by the object ID and positioning system 150 in determining the precise position.

A plurality of video stream elements 332 from the VS 132 video stream 232 may provide a bearing, a look angle, a color, a shape, a texture, an outline, a proximity, and a grouping of objects available to the object ID and positioning system 150 for precise positioning. A plurality of RADAR data elements 334 from the RF Radar relative 3D map 234 may provide a RCS, a shape, a bearing and range, an altitude, an outline, a proximity and a grouping.

Similarly, a plurality of LIDAR data elements 336 may include a bearing, a color, a shape, a texture, an outline, a proximity, and a grouping of objects available to the object ID and positioning system 150 for precise positioning. A plurality of map data elements 338 may include a bearing, a position, and a grouping received from map data 238 and available to the object ID and positioning system 150.

From the avionics suite 140, position data 240 may include a plurality of position elements 340 including an exemplary latitude and longitude relative to the datum, a grid coordinate relative to a separate datum, an MSL altitude, and an AGL altitude. Trajectory data 242 may provide trajectory elements 342 including autonomous aircraft 120 velocity vector (speed and 3D vector), and vertical speed. Aircraft configuration elements 344 may include a position of the landing gear, a flap setting, a position of a drag device, and a position of a primary flight control. Autonomous aircraft 120 status elements 346 may include a desired power setting and an actual power measurement of the autonomous aircraft 120, an attitude including a three-axis measurement (roll, pitch, yaw) of the autonomous aircraft 120 attitude, and a weight of the autonomous aircraft 120.

The processor 152, acting in compliance with direction from the object ID and positioning system 150, may receive each of these data elements and determine the hierarchy of sensor data. Based on the sensor hierarchy and the actual received sensor data, the object ID and positioning system 150 may compare the received sensor data (sensed attributes of objects) with the historical data (historical attributes) stored within the MS database 254 to determine the precise position of the autonomous aircraft 120.

Figure 3:
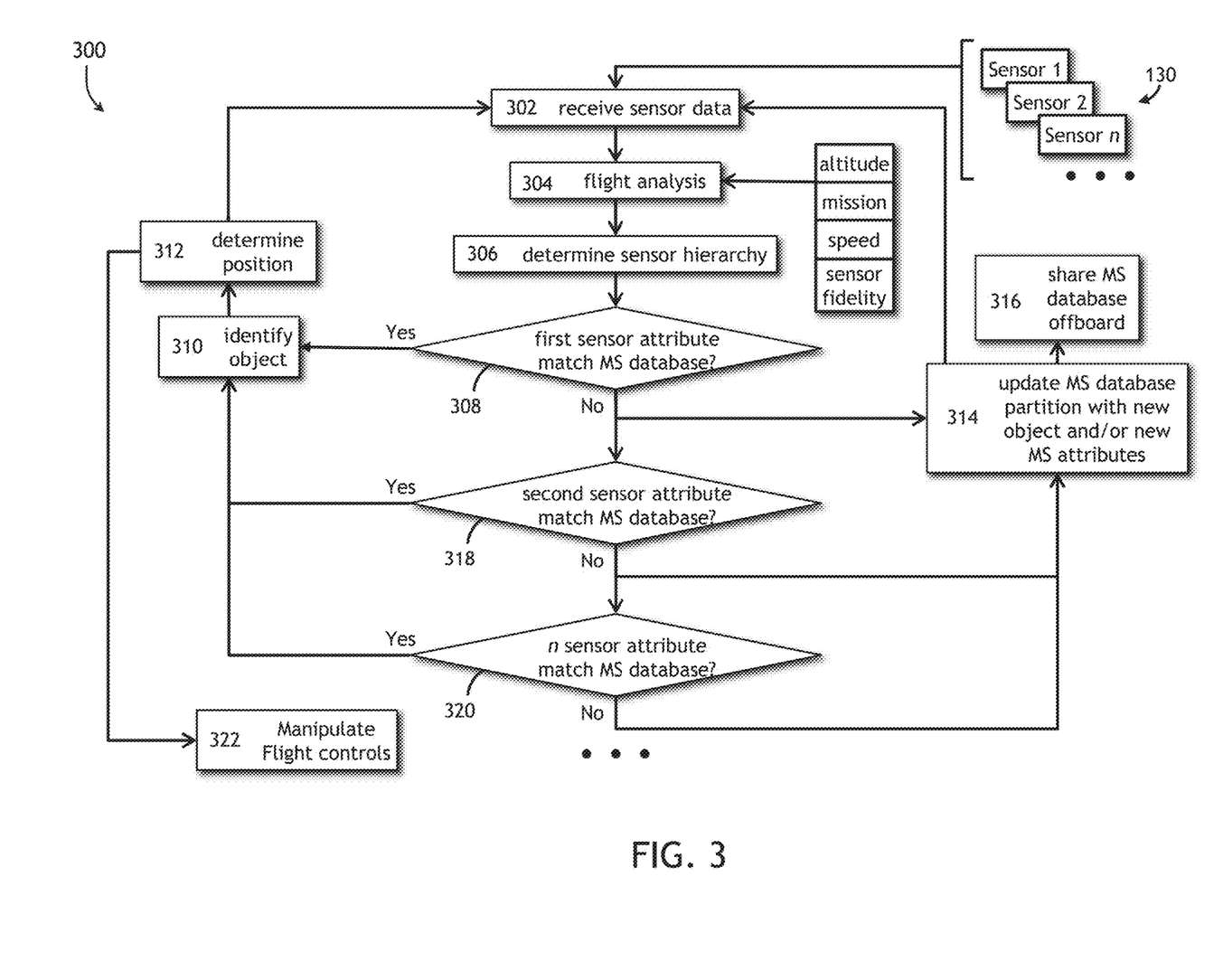
FIG. 3 is a logic flowchart of an exemplary embodiment of the inventive concepts disclosed herein.

FIG. 3 Logic Flow

Referring now to FIG. 3, a logic flowchart of an exemplary embodiment of the inventive concepts disclosed herein is shown. MS enhanced database logic flow 300 may indicate one exemplary logic flow of the object ID and positioning system 150. A step 302 may include receive sensor data from one or more sensors from the sensor suite 130. As above, the sensor data may include one or more attributes of the sensed object depending on the sensor from which the sensor data was received. A step 302 may include a flight analysis 304 based on the plurality of factors including altitude, mission, speed and sensor fidelity, etc. The object ID and positioning system 150 may use the flight analysis 304 for follow on action such as, step 306, the object ID and positioning system 150 may determine the sensor hierarchy to align the sensors in one or more orders of hierarchy from which to proceed with sensor data analysis.

In one embodiment of the inventive concepts disclosed herein, the object identification and positioning system 150 may employ a hierarchy of data sets from which to fuse to determine the most accurate precise position for the specific phase of flight. The above example with the autonomous aircraft 120 at FL450 may illustrate the GPS being an accurate sensor from which the object ID and positioning system 150 may derive the precise position at higher altitudes. At lower altitudes, the object identification and positioning system 150 may alter the hierarchy of sensor data sets. For example, at 5,000 ft AGL, the RF RADAR system 134 may offer accurate positioning data fused with GPS data to the object identification and positioning system 150. At 1,000 ft AGL, the VS 132 fused with the RA may offer a most accurate set of data to the object identification and positioning system 150.

In one embodiment of the inventive concepts disclosed herein, the object ID and positioning system 150 may determine the sensor hierarchy based on the flight analysis of a plurality of factors. An altitude as discussed above may be one factor while a mission may be another. For example, one mission profile may be a low altitude point to point navigation to deliver a package. In this low altitude situation, one sensor hierarchy may include the RA and LIDAR system 136 near the top of the sensor hierarchy.

Autonomous aircraft 120 speed may be another element for flight analysis to determine the sensor hierarchy. At high speeds, the GPS may be a most accurate sensor while at lower speeds the RF RADAR system 134 may be the most accurate. Sensor fidelity may offer another factor to which the object ID and positioning system 150 may reference for establishing the sensor hierarchy. Should the object ID and positioning system 150 determine that a sensor becomes unreliable due to that sensor producing data outside of a normalized position as determined by the remaining sensors within the sensor suite 140, the object ID and positioning system 150 may place that unreliable sensor lower on the sensor hierarchy.

The below table may illustrate one exemplary altitude-based and flight analysis-based hierarchy of sensor ranked by the object identification and positioning system 150:

| Altitude AGL | Phase of Flight | Sensor Hierarchy |
| --- | --- | --- |
| >10,000 | Cruise | GPS |
| | | IRS |
| | | Maps |
| 5,000 | Cruise/Descent | GPS |
| | | RF RADAR |
| 2,000 | Approach | LIDAR |
| | | RF RADAR |
| | | GPS |
| 500 | Short Final | VS |
| | | RA |
| | | GPS |
| | | ILS |
| 50 | Landing | VS |
| | | ILS |

Here, one sensor hierarchy may be altitude based while another may be mission, speed, and/or sensor fidelity based. Regardless of the basis for hierarchy, the object identification and positioning system 150 may identify which sensor may be the most accurate as well as which sensors are worthy of analysis. For example, at FL450, the RA may be nearly useless as range to the surface may be too distant for the RA to receive useable data.

A step 308 may include a query of whether an attribute received by a first sensor may match an attribute within the ME database 254. If the query 308 result is positive, the object ID and positioning system 150 may identify the sensed object at a step 310 and, at a step 312, determine the precise position of the autonomous aircraft 120 based on the object ID and the relative position of the autonomous aircraft 120 from the identified object. Here, the precise position may include a position relative to the sensed object and a position relative to the datum.

Should the result of query in step 308 be negative, the object ID and positioning system 150 may update the MS database 254 or a partition thereof at a step 314 with the attribute of the newly sensed object or a MS attribute of a historical object. Therefore, the next time a sensor may image the object the result of query 308 may be positive.

Further, should the object identification and positioning system 150 receive sensed information concerning an object not found within the MS database 254, it may operate to store each attribute of the newly found object and increase the quality of the MS database 254 for future use. For example, should an old building having a specific height (historical attribute) add an additional floor increasing the height attribute of the building or add additional structure to an existing roof feature, the object identification and positioning system 150 may operate to update the MS database with these new attributes to increase the accuracy of later positioning.

Moreover, the object identification and positioning system 150 may operate to share, at a step 316, a partition of its updated database offboard the autonomous aircraft 120 (e.g., wirelessly to a network) as well as flag the newly sensed attribute for post flight analysis so additional systems on other aircraft may take advantage of the updated and increasingly accurate MS database 254 and collectively operate more accurately.

The object identification and positioning system 150 may function to identify the sensed object based on the identification of the attributes of the object. In a comparison of historical attributes to sensed attributes in steps 308, 318, and 320, the object identification and positioning system 150 may operate to identify, in the step 310, the sensed object.

In addition, the object identification and positioning system 150 may compare the sensed attribute with the historical object data, the comparison including a percentage-based threshold match of a totality of object attributes. Here, a higher percentage of matching attributed may rise to an accurate identification of the sensed object while the object identification and positioning system 150 may set a threshold percentage below which the sensed object will be discarded in favor of a higher percentage match of object attributes.

The processor 152 may function using instructions to carry out one or more goals of the object ID and positioning system 150. The processor 152 may operate to filter each data stream in accordance with the flight analysis and the sensor hierarchy as well as function to carry out 3D triangulation calculations to determine the autonomous aircraft 120 precise position and altitude (AGL and MSL). Processor 152 may use autonomous aircraft 120 configuration and status 246 to aid in determining the sensor hierarchy. For example, should the autonomous aircraft 120 have the landing gear down with the RA reporting 200 ft AGL, the object ID and positioning system 150 may determine the autonomous aircraft 120 is ready for landing and appropriately order the sensor hierarchy and therefore, the received sensor data for analysis.

Figure 4:
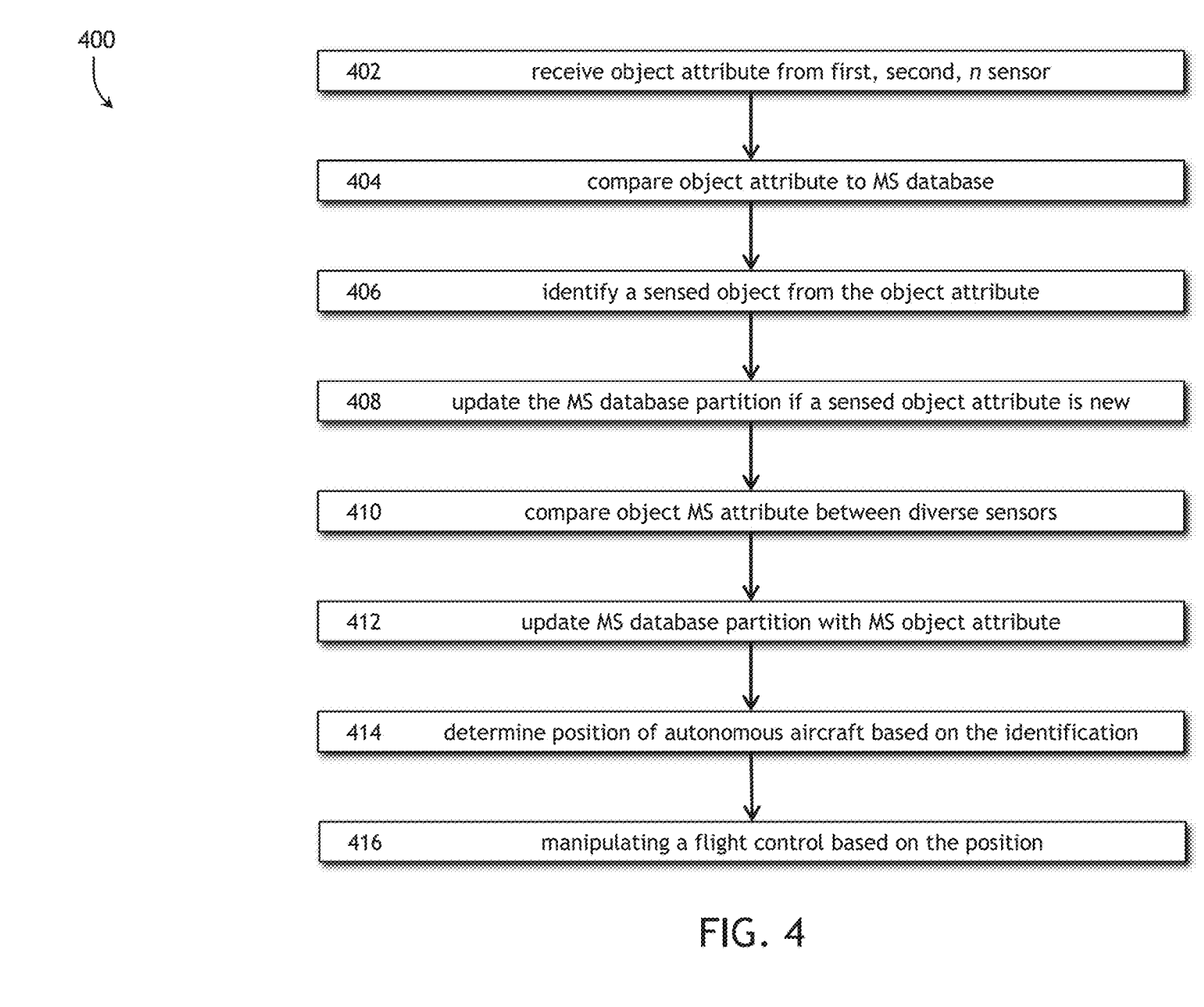
FIG. 4 is a diagram of method steps exemplary of one embodiment of the inventive concepts disclosed herein.

FIG. 4 Method Flow

Referring now to FIG. 4, a diagram of method steps exemplary of one embodiment of the inventive concepts disclosed herein is shown. MS enhanced database method flow 400 may include exemplary steps for a method for MS object identification. At step 402 may include receiving sensor data including an object attribute from first, second, and n sensor. The sensor data includes an attribute of a sensed object received from a sensor of an autonomous aircraft sensor suite 130 onboard an autonomous aircraft 120. Here, the first sensor may be operating within a first spectrum while the second and additional sensors may operate in a diverse spectrum.

In one embodiment of the inventive concepts disclosed herein, a first spectrum may include a RADAR frequency band and a visible frequency band while the second spectrum may include frequencies between an ultraviolet a far-infrared band. Spectrum diversity here may include a diversity in a reflectivity, a frequency, a wavelength, a temperature, an emissivity and a bandwidth.

At a step 404, the method may compare the received object attribute with those attributes within the MS database 254. Should the comparison result in a match, a step 406 may include identifying the sensed object based on the matched object attribute. Should the comparison result in a non-match, a step 408 may include updating the MS database or a partition thereof with the first attribute if the first attribute comparison results in a non-match.

A step 410 may include comparing MS attributes of a sensed object between diverse sensors. For example, a vertical building may have a height as an attribute. The RF RADAR system 134 as well as the VS 132 may sense the height attribute. This diverse sensor comparison 410 may operate to identify the same attribute as sensed by diverse sensors, each operating in diverse spectra. The method 400 may then correlate the received attributes as the same attribute but received from diverse sensors and identify the sensed object based on the correlation.

A step 412 may include updating the MS database or a partition thereof with a newly sensed MS object attribute. The update here may include the correlation between diverse sensors labeling a particular object attribute as multi-sensor significant. A step 414 may include determining a precise position of the autonomous aircraft 120 based on the identification of the sensed object and a triangulation of one or more instances of BRA data received relative to the sensed object and a step 416 may include manipulating a flight control based on the precise position.

Figure 5A:
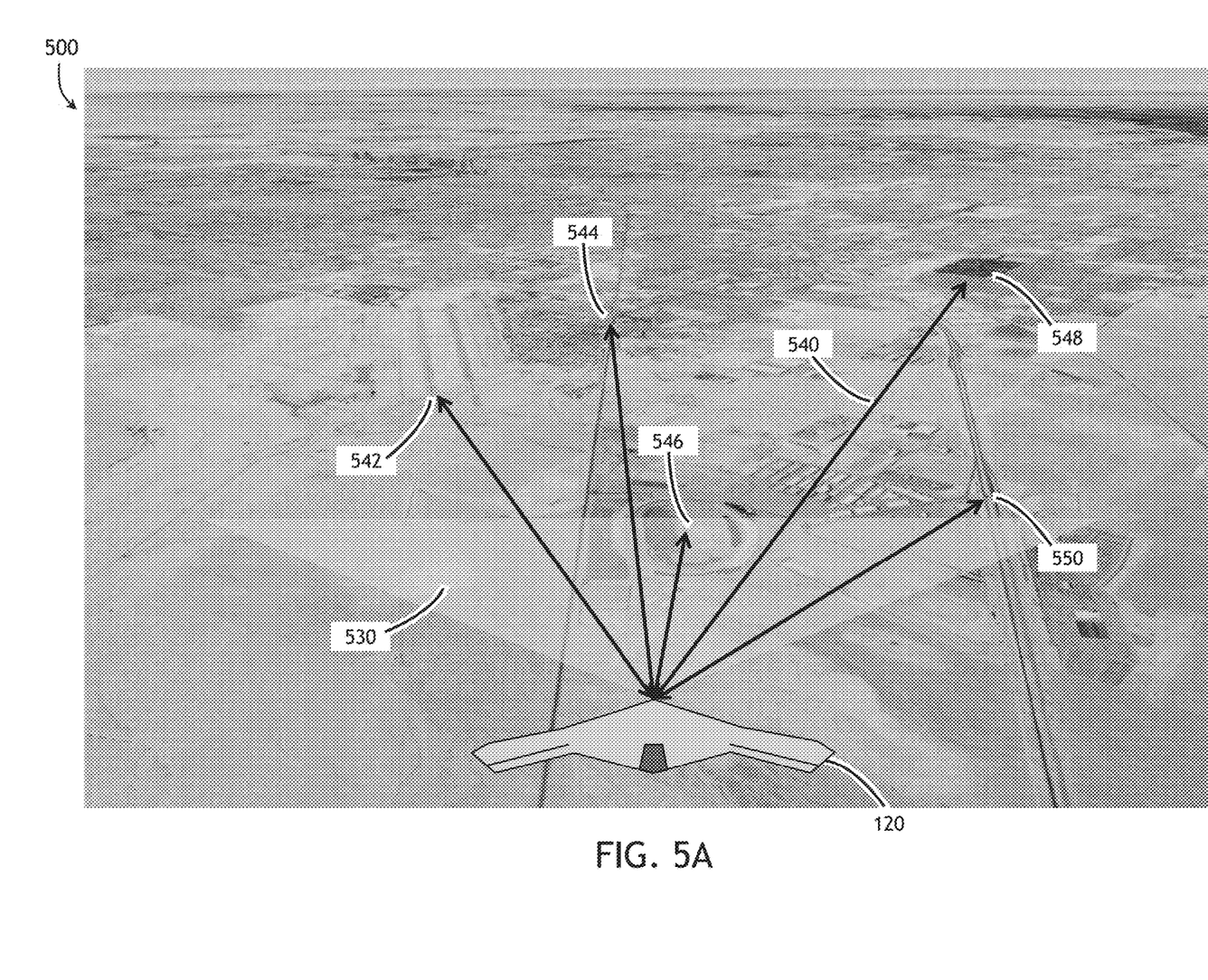
FIGS. 5A and 5B are diagrams of an arrival view in accordance with one embodiment of the inventive concepts disclosed herein.
Figure 5B:
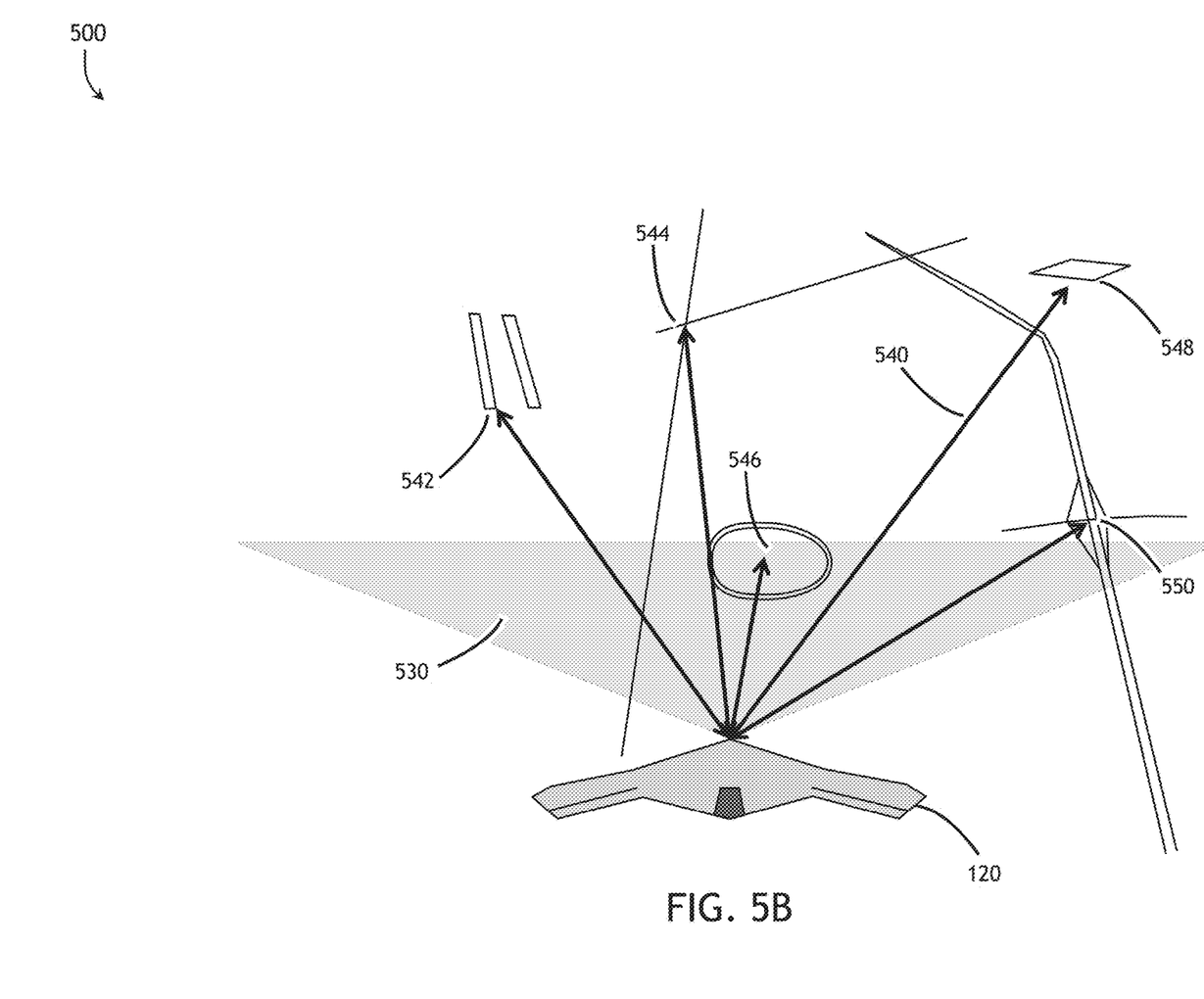

FIGS. 5A and 5B Arrival View

Referring now to FIGS. 5A and 5B, diagrams of an arrival view in accordance with one embodiment of the inventive concepts disclosed herein is shown. An arrival view 500 may portray objects available to the sensor suite 120 for use in positioning. Here, a plurality of objects within view of the sensors may include RADAR significant objects as well as LIDAR significant objects. A sensor FOV 530 may indicate a possible area of capability of one or more of the sensors.

RADAR line of sight (LOS) 540 may enable the RF RADAR 134 to image RADAR significant ground objects such as a runway 542, a road intersection 544, a racetrack 546, a golf course 548, and an interchange 550 while the LIDAR system 136 may be able to image the same and additional objects. Although shown as a forward view sensor FOV 530, each of the sensors may possess an ability to sense objects at any relative bearing from the autonomous aircraft 120. For example, one LIDAR system 136 may be able to view objects in a 360-degree azimuth relative to the autonomous aircraft 120. It is contemplated herein, sensors creating a "sphere" of FOV with the autonomous aircraft 120 at the center of the sphere may enable the sensor suite 122 to sense objects without bearing limitation.

Of note, many objects may not be mutually exclusive to a single sensor within the sensor suite 122. For example, a visually significant object may also be LIDAR significant while a RADAR significant object may also be an identifiable map object. Each of the sensors within the sensor suite 122 may operate individually to sense each of the significant objects within view to provide sensor data to the object ID and positioning system 310.

Referring to FIG. 5B, a similar view of the arrival scene may detail the same objects able to be sensed by one or more of the sensors within the sensor suite 130. Each object 542-550 may be sensed by one of the sensors regardless of weather conditions. For example, the racetrack 546 may be an accurate object for positioning during Visual Flight Rules (VFR) operations while the interchange 550 may be a more accurate object sensed during Instrument Flight Rules (IFR) operations.

Figure 6A:
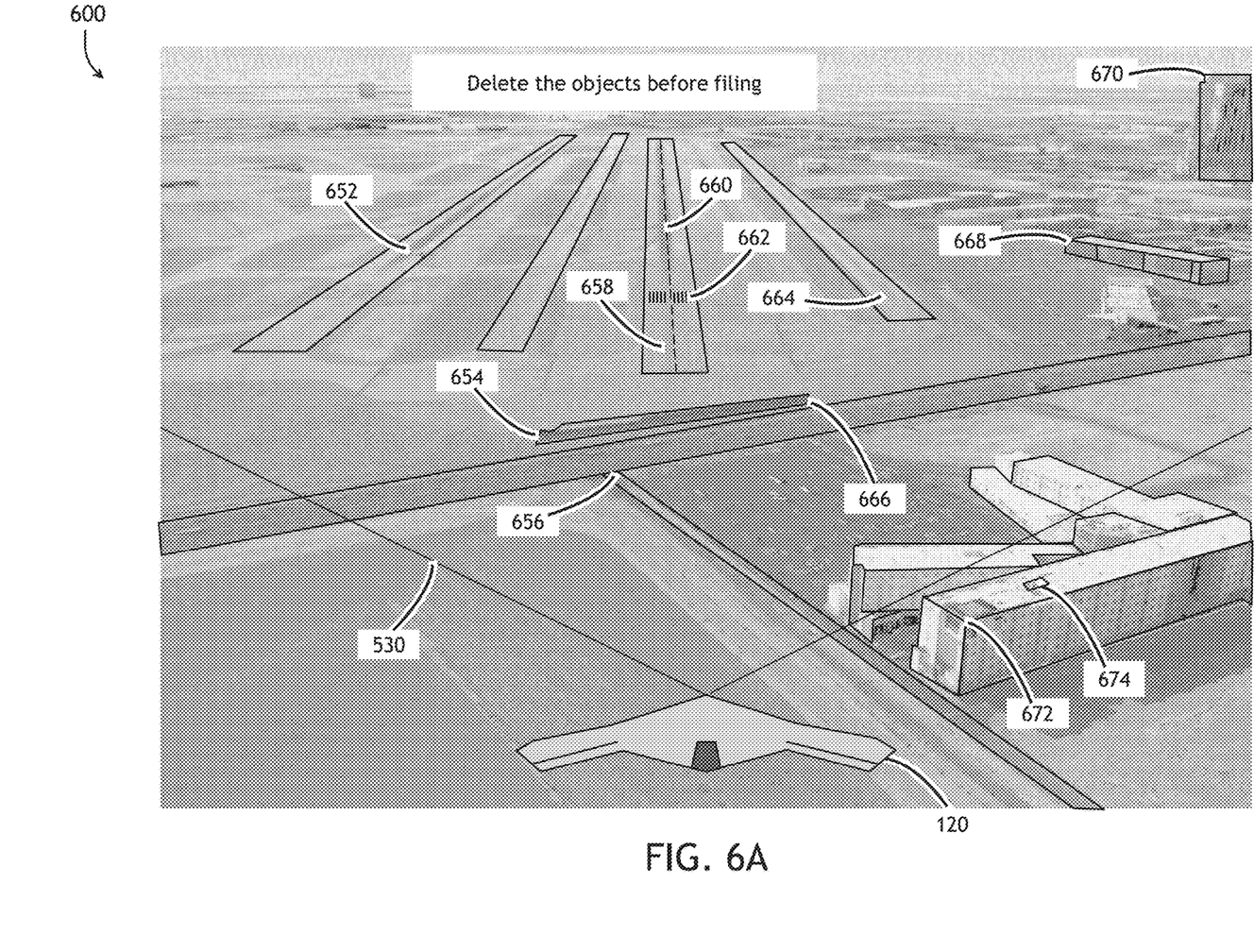
FIGS. 6A and 6B are diagrams of an approach view of an exemplary embodiment of the inventive concepts disclosed herein.
Figure 6B:
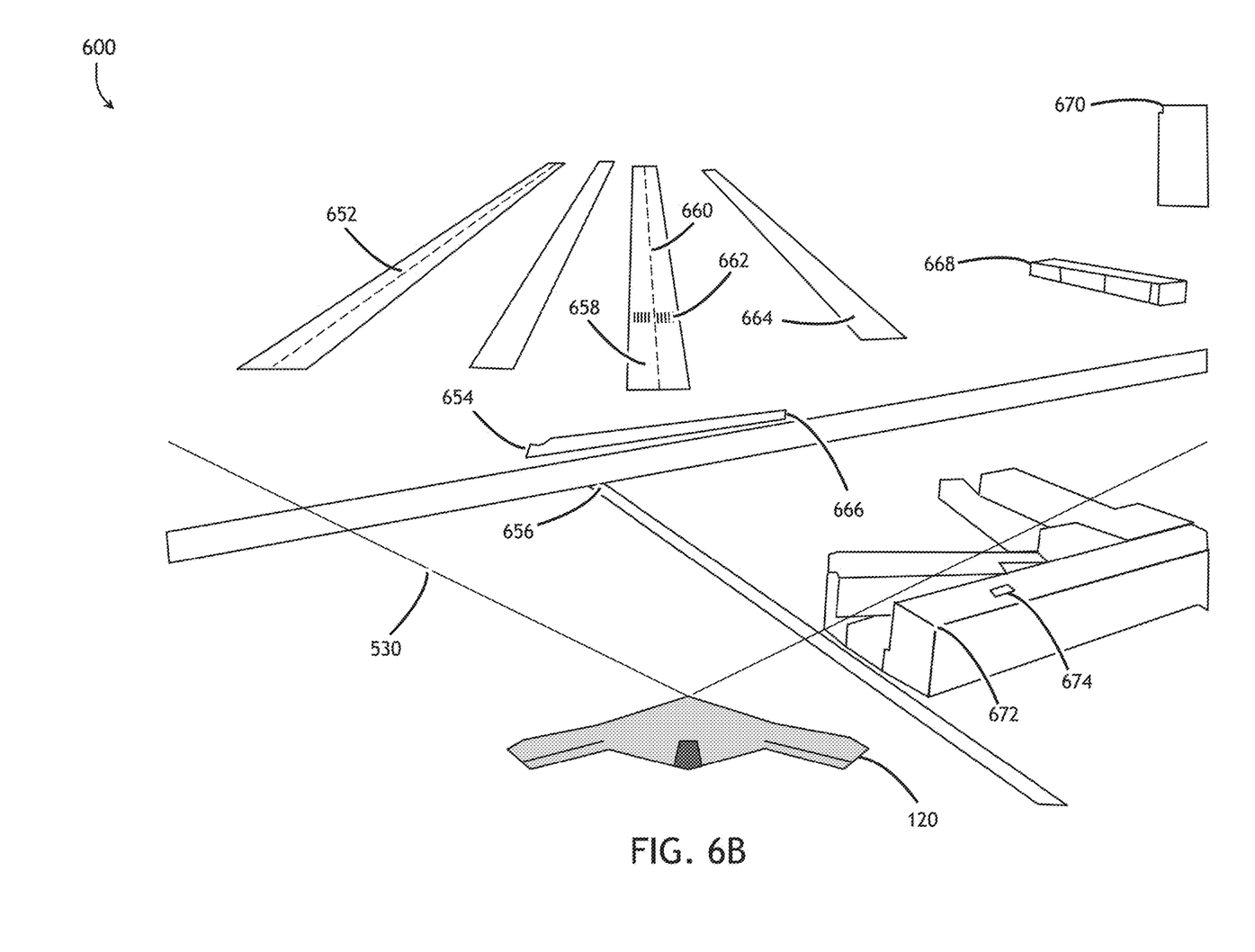

FIGS. 6A and 6B Approach View

Referring now to FIGS. 6A and 6B, diagrams of an approach view of an exemplary embodiment of the inventive concepts disclosed herein is shown. Approach view 600 may indicate each object available to the sensor suite 130 for identification and precise positioning of the autonomous aircraft 120. Here FIG. 6A may indicate a VFR scene of objects available to the sensor suite 130. The sensor FOV 530 may indicate objects forward of the wing of autonomous aircraft 120 may be optimal for precise positioning. Here, a parallel runway LAS 19L 652 may offer object attributes for the object ID and positioning system 150 to use. An east end 654 as well as a west end 666 of a blast fence may be RADAR significant as well as LIDAR significant. A street intersection 656 may offer significance to a plurality of sensors including the RF RADAR system 134 and the maps system 138. Details from the landing runway LAS 19R 658 may include a runway centerline 660 as well as TDZ markings 662. A parallel taxiway hotel 664 may provide object attributes usable for precise positioning.

A hangar south end 668 as well as a building southeast corner 670 may provide detailed attributes from which the object ID and positioning system 150 may derive PRA data. Closer in to the autonomous aircraft 120, a building northeast corner 672 and rooftop building HVAC 674 may provide details for precise positioning.

FIG. 6B may reveal similar objects available to the object ID and positioning system 150 via the sensor suite 130 while the autonomous aircraft 120 may operate in IFR conditions. Again, the object ID and positioning system 150 may provide precise positioning regardless of the weather conditions as well as despite inoperative components of radiating ground-based positioning and navigation equipment.

CONCLUSION

As will be appreciated from the above, a system and related method for offering MS attributes of sensed objects stored within a multispectral database accessible by the advanced autonomous aircraft FMS. The multispectral attributes may be sensed and compared by a combined suite of sensors enabling the advanced autonomous aircraft to operate at any airport despite the weather conditions It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for multispectral object identification, comprising:
   an autonomous aircraft sensor suite onboard an autonomous aircraft including at least one of: a vision system (VS), a radio frequency (RF) radio detection and ranging (RADAR) system, a laser imaging detection and ranging (LIDAR) system, a map database, and an avionics suite;
   an object identification and positioning system associated with the autonomous aircraft sensor suite and including at least one processor; and
   a storage including a multispectral (MS) database associated with each of the object identification and positioning system and the processor, the MS database including a plurality of historical object data defining an associated plurality of objects;
   a tangible, non-transitory memory within the storage configured to communicate with the at least one processor, the tangible, non-transitory memory having instructions stored therein that, in response to execution by the at least one processor, cause the at least one processor to:
      determine a sensor hierarchy of the autonomous aircraft sensor suite based on each of: a mission of the autonomous aircraft, a speed of the autonomous aircraft, an altitude of the autonomous aircraft, or a range between the autonomous aircraft and a sensed object;
      receive first sensor data from at least one first sensor of the autonomous aircraft sensor suite, the at least one first sensor selected based on the sensor hierarchy, the at least one first sensor operating within a first spectrum, the first sensor data including at least one first attribute of the sensed object;
      compare the received at least one first attribute to the historical object data;
      identify the sensed object if the first attribute comparison results in a match;
      update a partition of the MS database with the at least one first attribute of the sensed object if the first attribute comparison results in a non-match;
      receive second sensor data from at least one second sensor of the autonomous aircraft sensor suite, the at least one second sensor selected based on the sensor hierarchy, the second sensor data including at least one second attribute of the sensed object, the at least one second sensor operating within a second spectrum diverse from the first spectrum;
      compare the received at least one second attribute to the historical object data;
      identify the sensed object if the second attribute comparison results in a match;
      update the partition of the MS database with the at least one second attribute of the sensed object if the second attribute comparison results in a non-match;
      determine a position of the autonomous aircraft based on the identification of the sensed object; and
      manipulate a flight control based on the position.

2. The system for multispectral object identification of claim 1, wherein the partition of the MS database further includes:
   a first partition comprising historical object data and a second partition comprising a newly sensed attribute of an object.

3. The system for multispectral object identification of claim 1, wherein the first spectrum is one of a RADAR frequency band and a visible frequency band and wherein the second spectrum is between an ultraviolet a far-infrared band.

4. The system for multispectral object identification of claim 1, wherein the at least one first attribute and the at least one second attribute of the sensed object further comprises a shape, a size, a texture, a reflectivity level, a radar cross section, and a color, and a three-dimensional position relative to a datum, the datum includes a vertical geodetic reference datum and a horizontal geodetic reference datum.

5. The system for multispectral object identification of claim 4, wherein determine a position of the autonomous aircraft further includes a determination of a position relative to the sensed object and a position relative to the datum.

6. The system for multispectral object identification of claim 1, wherein the sensed object includes a terrain object, a geographical object, a natural object, a man-made object, an airport prepared surface, a landing surface, a flight deck, an aircraft, and a target of interest.

7. The system for multispectral object identification of claim 1, wherein identify the sensed object further comprises a comparison of the sensed at least one first attribute with the historical object data, the comparison including a percentage-based threshold match of a totality of object attributes.

8. The system for multispectral object identification of claim 1, wherein the second spectrum diverse from the first spectrum further includes a diversity in at least one of a reflectivity, frequency, a wavelength, a temperature, an emissivity and a bandwidth.

9. The system for multispectral object identification of claim 1, wherein the object identification and positioning system determines which sensor of the sensor suite is the at least one first sensor and the at least one second sensor based on the sensor hierarchy, the sensor hierarchy based at least on a flight analysis.

10. The system for multispectral object identification of claim 9, wherein the flight analysis includes an analysis of the autonomous aircraft at least one of: an altitude, a mission, a speed and a sensor fidelity.

11. A method for multispectral object identification, comprising:
    determining a sensor hierarchy of an autonomous aircraft sensor suite based on each of: a mission of an autonomous aircraft, a speed of the autonomous aircraft, an altitude of the autonomous aircraft, or a range between the autonomous aircraft and a sensed object;
    receiving first sensor data from at least one first sensor of an autonomous aircraft sensor suite, the at least one first sensor selected based on the sensor hierarchy onboard an autonomous aircraft, the first sensor operating within a first spectrum, the first sensor data including a first attribute of the sensed object;
    comparing the first attribute to a plurality of historical object data within a multispectral (MS) database associated with a storage onboard the autonomous aircraft;
    identifying the sensed object if the first attribute comparison results in a match;
    updating a partition of the MS database with the first attribute if the first attribute comparison results in a non-match;
    receiving second sensor data from at least one second sensor of the autonomous aircraft sensor suite, the at least one second sensor selected based on the sensor hierarchy, the second sensor data including a second attribute of the sensed object, the second sensor operating within a second spectrum diverse from the first spectrum;
    comparing the second attribute to the historical object data;
    identifying the sensed object if the second attribute comparison results in a match;
    updating the partition of the MS database with the second attribute of the sensed object if the comparison results in a non-match;
    determining a position of the autonomous aircraft based on the identification of the sensed object; and
    manipulating an autonomous aircraft flight control based on the position.

12. The method for multispectral object identification of claim 11, wherein the autonomous aircraft sensor suite onboard an autonomous aircraft comprises at least one of: a vision system (VS), a radio frequency (RF) radio detection and ranging (RADAR) system, a laser imaging detection and ranging (LIDAR) system, a map database, and an avionics suite.

13. The method for multispectral object identification of claim 12, wherein the avionics suite further comprises at least one of an Inertial Reference System (IRS), a Global Positioning System (GPS), an Instrument Landing System (ILS), and a Radio Altimeter (RA).

14. The method for multispectral object identification of claim 11, wherein the at first spectrum is one of a RADAR frequency band and a visible frequency band and wherein the second spectrum is between an ultraviolet a far-infrared band.

15. The method for multispectral object identification of claim 11, wherein the first attribute and the second attribute of the sensed object comprises one of a shape, a size, a texture, a reflectivity level, a radar cross section, and a color, and a three-dimensional position relative to a datum, the datum includes a vertical geodetic reference datum and a horizontal geodetic reference datum.

16. The method for multispectral object identification of claim 11, wherein receiving sensor data from at least two sensors of a sensor suite further comprises a phase of flight analysis within the determination of the sensor hierarchy, each based on at least one of an altitude, a mission, a speed, and a sensor fidelity.

17. The method for multispectral object identification of claim 11, wherein updating the partition of the MS database further comprises:
    flagging a newly sensed attribute stored in the partition of the MS database for post-flight update and verification; and
    sharing the updated partition of the MS database offboard the autonomous aircraft.

18. The method for multispectral object identification of claim 11, wherein identifying the sensed object further comprises a comparison of the first and second attribute with the historical object data, the comparison including:
    a comparison of the received first sensor data and second sensor data between diverse sensors;
    a correlation of the sensor data if the comparison results in a match; and
    an identification of the sensed object based on the correlation.

19. The method for multispectral object identification of claim 11, further including determining which sensor of the sensor suite is the first sensor and the second sensor based on the sensor hierarchy, the sensor hierarchy based on a flight analysis.

20. The method for multispectral object identification of claim 19, wherein the flight analysis includes an analysis of at least one of: an altitude, a mission, a speed and a sensor fidelity associated with the autonomous aircraft.

* * * * *